United States Patent
Taguchi et al.

(10) Patent No.: US 8,367,264 B2
(45) Date of Patent: Feb. 5, 2013

(54) FUEL CELL SYSTEM WITH CO DETECTOR

(75) Inventors: Kiyoshi Taguchi, Osaka (JP); Yoshio Tamura, Hyogo (JP); Yoshikazu Tanaka, Osaka (JP); Shigeki Yasuda, Osaka (JP)

(73) Assignee: Panasonic Corporation, Osaka (JP)

( * ) Notice: Subject to any disclaimer, the term of this patent is extended or adjusted under 35 U.S.C. 154(b) by 386 days.

(21) Appl. No.: 12/594,991

(22) PCT Filed: Feb. 20, 2009

(86) PCT No.: PCT/JP2009/000746
§ 371 (c)(1),
(2), (4) Date: Oct. 7, 2009

(87) PCT Pub. No.: WO2009/104419
PCT Pub. Date: Aug. 27, 2009

(65) Prior Publication Data
US 2010/0081021 A1    Apr. 1, 2010

(30) Foreign Application Priority Data
Feb. 20, 2008    (JP) .................................. 2008-038238

(51) Int. Cl.
*H01M 8/04*    (2006.01)
*H01M 8/10*    (2006.01)

(52) U.S. Cl. ........ 429/444; 429/427; 429/430; 429/412; 204/196.02; 204/424

(58) Field of Classification Search .................. None
See application file for complete search history.

(56) References Cited

U.S. PATENT DOCUMENTS

| | | | |
|---|---|---|---|
| 2003/0159928 A1 * | 8/2003 | Kojima et al. | 204/408 |
| 2003/0234178 A1 * | 12/2003 | Kirby et al. | 204/426 |
| 2009/0117426 A1 * | 5/2009 | Harada et al. | 429/20 |

FOREIGN PATENT DOCUMENTS

| | | |
|---|---|---|
| JP | 08-035655 | 2/1996 |
| JP | 2003-028418 | 1/2003 |
| JP | 2003-214995 | 7/2003 |
| JP | 2006-213566 | 8/2006 |
| JP | 2006-213567 | 8/2006 |

* cited by examiner

*Primary Examiner* — Keith Walker
(74) *Attorney, Agent, or Firm* — McDermott Will & Emery LLP

(57) ABSTRACT

A fuel cell system of the present invention includes: a hydrogen generator (1) having a reformer (1*a*) configured to generate a hydrogen-containing gas by a reforming reaction using a raw material; a fuel cell (2) configured to generate electric power using the hydrogen-containing gas supplied from the hydrogen generator (1); a combustor (3) configured to combust an anode off gas discharged from the fuel cell (2) to heat the reformer (1*a*); a CO detector (7) configured to detect a carbon monoxide concentration of a flue gas discharged from the combustor (3); an electric heater (8) configured to heat the CO detector (7); and a controller (19), and the controller (19) is configured to increase an amount of energization to the electric heater (8) in accordance with an increase in an amount of electric power generated by the fuel cell (2).

14 Claims, 10 Drawing Sheets

FUEL CELL SYSTEM WITH CO DETECTOR

RELATED APPLICATIONS

This application is the U.S. National Phase under 35 U.S.C. §371 of International Application No. PCT/JP2009/000746, filed on Feb. 20, 2009, which in turn claims the benefit of Japanese Application No. 2008-038238, filed on Feb. 20, 2008, the disclosures of which Applications are incorporated by reference herein.

TECHNICAL FIELD

The present invention relates to a fuel cell system including a hydrogen generator having a combustor configured to supply heat for a reforming reaction.

BACKGROUND ART

As shown in FIG. 8, a conventional fuel cell system includes a hydrogen generator 81 and a fuel cell 82. The hydrogen generator 81 generates a hydrogen-containing gas by a reforming reaction using as a raw material a hydrogen-containing organic compound, such as a city gas. The fuel cell 82 generates electric power using the hydrogen-containing gas supplied from the hydrogen generator 81 and an oxidizing gas. The fuel cell system is normally configured such that a combustible anode off gas discharged from the fuel cell 82 is combusted in a combustor, and heat necessary for the reforming reaction is supplied to the hydrogen generator 81. A CO sensor 85 is normally used to confirm combustion stability of the combustor 83. If moisture in a flue gas discharged from the combustor 83 condenses on the CO sensor 85, detection failures occur. Therefore, proposed is to dispose a water discharging portion 84, configured to discharge condensed water, on a flue gas channel in front of the CO sensor 85 (see Patent Document 1 for example).

Meanwhile, to solve the problem of the condensation with respect to the CO sensor, proposed is a combusting device in which an electric heater is disposed in the vicinity of the CO sensor (see Patent Document 2 for example).

Patent Document 1: Japanese Laid-Open Patent Application Publication 2006-213566

Patent Document 2: Japanese Laid-Open Patent Application Publication 8-035655

DISCLOSURE OF THE INVENTION

Problems to be Solved by the Invention

Here, in a case where the electric heater is disposed in the vicinity of the CO sensor as in Patent Document 2 to solve the problem of the condensation with respect to the CO sensor of the fuel cell system in Patent Document 1, the electric heater needs to heat the CO sensor to prevent the condensation on the CO sensor since the temperature of ambient surroundings of the fuel cell system including the CO sensor is low at the time of a start-up operation of the fuel cell system. In contrast, since the temperature is increased at the time of the start-up operation of the fuel cell system, the amount of heat for heating the CO sensor is normally reduced during an electric power generating operation. Here, the problem is that if the amount of electric power generated by the fuel cell is increased during the electric power generating operation, the condensation may occur on the CO sensor.

The present invention was made to solve the above problems, and an object of the present invention is to provide a fuel cell system which uses an electric heater configured to heat a CO sensor disposed on a passage of a flue gas of a combustor configured to combust an anode off gas of a fuel cell, and is capable of suppressing condensation with respect to the CO sensor during an electric power generating operation of the fuel cell as compared to before.

Means for Solving the Problems

As a result of diligent studies regarding the above problems, the present inventors have obtained findings as follows: even in a case where the amount of electric power generated by the fuel cell is large, i.e., the amount of combustible gas in the anode off gas may be large and the amount of moisture in the flue gas may be large, the condensation is unlikely to occur as long as the amount of electric power generated by the fuel cell is maintained at such high level, but the condensation with respect to the CO sensor tends to occur in a process in which the amount of electric power generated by the fuel cell is increasing. This may be because: in a case where the amount of electric power generated by the fuel cell is small, the amount of heat contained in the flue gas is small, so that the temperature of the CO sensor itself tends to become low; and if the amount of electric power generated by the fuel cell increases when the temperature of the sensor is low, the flue gas which is high in temperature and has a large amount of moisture contacts the CO sensor, and this tends to cause the condensation.

To solve the above conventional problems based on the above findings, a fuel cell system of the present invention includes: a hydrogen generator including a reformer configured to generate a hydrogen-containing gas by a reforming reaction using a raw material; a fuel cell configured to generate electric power using the hydrogen-containing gas supplied from the hydrogen generator; a combustor configured to combust an anode off gas discharged from the fuel cell to heat the reformer; a CO detector configured to detect a carbon monoxide concentration of the flue gas discharged from the combustor; an electric heater configured to heat the CO detector; and a controller, wherein the controller is configured to increase an amount of energization to the electric heater in accordance with an increase in an amount of electric power generated by the fuel cell.

With this configuration, it is possible to suppress the possibility that when the amount of electric power generated by the fuel cell is increased, the moisture contained in the anode off gas of the fuel cell condenses on the CO detector. Thus, combustion stability of the combustor can be more stably monitored.

Moreover, the fuel cell system of the present invention may further include an electric power generation amount controller configured to control an amount of electric power obtained from the fuel cell, wherein the controller may be configured to increase the amount of energization to the electric heater in a case where the electric power generation amount command value given to the electric power generation amount controller increases.

Moreover, in the fuel cell system of the present invention, the controller may be configured to increase the amount of energization to the electric heater in a case where an amount of power consumption of an electric power load is larger than the amount of electric power generated by the fuel cell.

Moreover, in the fuel cell system of the present invention, the controller may be configured to increase the amount of energization to the electric heater in a case where the amount of electric power generated by the fuel cell increases.

Moreover, in the fuel cell system of the present invention, increasing the amount of energization to the electric heater may include turning the electric heater from off to on.

Moreover, in the fuel cell system of the present invention, the controller may control the electric heater such that in a case where the electric heater is turned on, the electric heater is maintained in an on state for a predetermined holding time, regardless of increase or decrease in the amount of electric power generated by the fuel cell after the electric heater is turned on.

With this configuration, the number of on-off operations of the electric heater is reduced, so that the durability of the electric heater improves.

Moreover, in the fuel cell system of the present invention, an average amount of energization to the electric heater during an electric power generating operation of the fuel cell system may be smaller than the average amount of energization to the electric heater during a start-up operation of the fuel cell system.

With this configuration, while suppressing a decrease in energy efficiency due to the electric power consumption of the electric heater, it is possible to suppress the possibility that the moisture contained in the anode off gas of the fuel cell condenses on the CO detector. Thus, the combustion stability of the combustor can be more stably monitored.

Moreover, in the fuel cell system of the present invention, an average amount of energization to the electric heater during an electric power generating operation of the fuel cell system may be smaller than a maximum amount of energization to the electric heater during a start-up operation of the fuel cell system.

Moreover, in the fuel cell system of the present invention, a base amount of energization to the electric heater which is an amount before the amount of energization to the electric heater during an electric power generating operation of the fuel cell system is increased may be smaller than the base amount of energization to the electric heater during a start-up operation of the fuel cell system.

With this configuration, while suppressing the decrease in the energy efficiency due to the electric power consumption of the electric heater, it is possible to suppress the possibility that the moisture contained in the anode off gas of the fuel cell condenses on the CO detector. Thus, the combustion stability of the combustor can be more stably monitored.

Moreover, in the fuel cell system of the present invention, the base amount of energization to the electric heater which is the amount before the amount of energization to the electric heater during the electric power generating operation of the fuel cell system may be zero.

Further, in the fuel cell system of the present invention, the controller may be configured to turn off the electric heater after the on state of the electric heater is continued for the predetermined holding time.

The above object, other objects, features and advantages of the present invention will be made clear by the following detailed explanation of preferred embodiments with reference to the attached drawings.

Effects of the Invention

In accordance with the fuel cell system of the present invention, it is possible to suppress the condensation of the moisture, contained in the flue gas, on the CO detector when the amount of electric power generated by the fuel cell is increased. Thus, the combustion stability of the combustor configured to heat the reformer can be more stably monitored.

Figure 1:
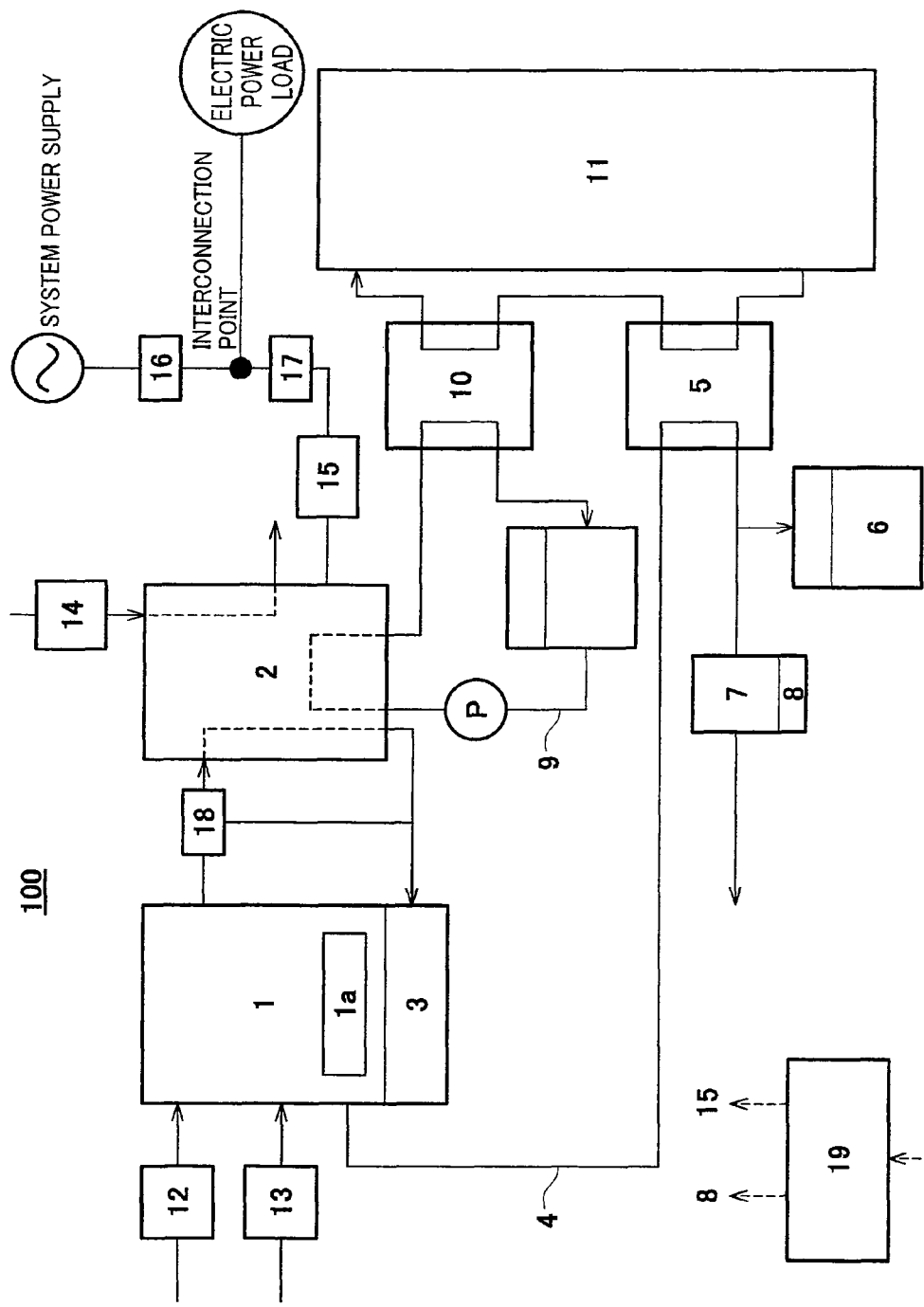
FIG. 1 is a schematic diagram showing a configuration of a fuel cell system of Embodiment 1 of the present invention.

EXPLANATION OF REFERENCE NUMBERS 1 hydrogen generator
2 fuel cell
3 combustor
4 flue gas passage
5 first heat exchanger
6 condensed water tank
7 CO detector
8 electric heater
9 cooling water passage
10 second heat exchanger
11 hot water tank
12 material supplier
13 water supplier
14 oxidizing gas supplier
15 electric power generation amount controller
16 first current detector
17 second current detector
18 switching unit
19 controller
81 hydrogen generator
82 fuel cell
83 combustor
84 water discharging portion
85 CO sensor
100 fuel cell system

BEST MODE FOR CARRYING OUT THE INVENTION

Hereinafter, best modes of the present invention will be explained in reference to the drawings. In the drawings, the same reference numbers are used for the same or corresponding portions, and a repetition of the same explanation is avoided.

Embodiment 1

FIG. 1 is a diagram showing a schematic configuration of a fuel cell system of Embodiment 1 of the present invention.

As shown in FIG. 1, a fuel cell system 100 of Embodiment 1 includes: a hydrogen generator 1 having a reformer 1a configured to generate a hydrogen-containing gas by a steam-reforming reaction using a raw material supplied from a material supplier 12 and water supplied from a water supplier 13; a fuel cell 2 configured to generate electric power using the hydrogen-containing gas supplied from the hydrogen generator 1 and an oxidizing gas supplied from an oxidizing gas supplier 14; a combustor 3 configured to combust an anode off gas discharged from the fuel cell 2 to supply heat to the reformer 1a for the steam-reforming reaction; a flue gas passage 4 through which a flue gas discharged from the combustor 3 flows; a first heat exchanger 5 configured to condense moisture in the flue gas flowing through the flue gas passage 4; a condensed water tank 6 configured to store condensed water condensed by the first heat exchanger 5; a CO detector 7 configured to detect a carbon monoxide concentration of the flue gas from which the moisture is removed by the first heat exchanger 5; an electric heater 8 disposed in the vicinity of the CO detector 7 to suppress the condensation on the CO detector 7; a cooling water passage 9 through which cooling water for cooling down the fuel cell 2 flows; a second heat exchanger 10 configured to recover heat from the cooling water; a hot water tank 11 configured to store as hot water the heat recovered by the first heat exchanger 5 and the second heat exchanger 10; an electric power generation amount controller 15 configured to control the amount of electric power obtained from the fuel cell 2; a first current detector 16 disposed between a system power supply and an interconnection point located between the fuel cell 2 and the system power supply; a second current detector 17 configured to detect the amount of current output from the electric power generation amount controller 15; a switching unit 18 configured to switch a supply destination of the hydrogen-containing gas generated in the hydrogen generator 1, between the fuel cell 2 and a passage bypassing the fuel cell 2; and a controller 19 configured to control operations of devices in the fuel cell system 100.

The hydrogen generator 1 includes not only the reformer 1a but also a shift converter (not shown) configured to reduce, by a shift reaction, carbon monoxide in the hydrogen-containing gas generated by the reformer 1a and a CO remover (not shown) configured to reduce the carbon monoxide by an oxidation reaction. The material supplier 12 supplies the hydrogen-containing organic compound, such as a city gas, as the raw material to the hydrogen generator 1. The electric power generation amount controller 15 includes an inverter as an AC/DC inverter configured to convert DC power of the fuel cell 2 into AC power. The controller 19 outputs an electric power generation amount command value to the electric power generation amount controller 15 based on power consumption of an electric power load so as to follow the power consumption of the electric power load. In the fuel cell system 100 of Embodiment 1, the controller 19 controls on and off of the electric heater 8 based on the electric power generation amount command value. Moreover, for example, a sheath heater or the like is utilized as the electric heater 8. An installation mode of the electric heater 8 is not especially limited as long as the electric heater 8 can heat the CO detector 7.

Next, operations of the fuel cell system 100 of Embodiment 1 will be explained.

Figure 2:
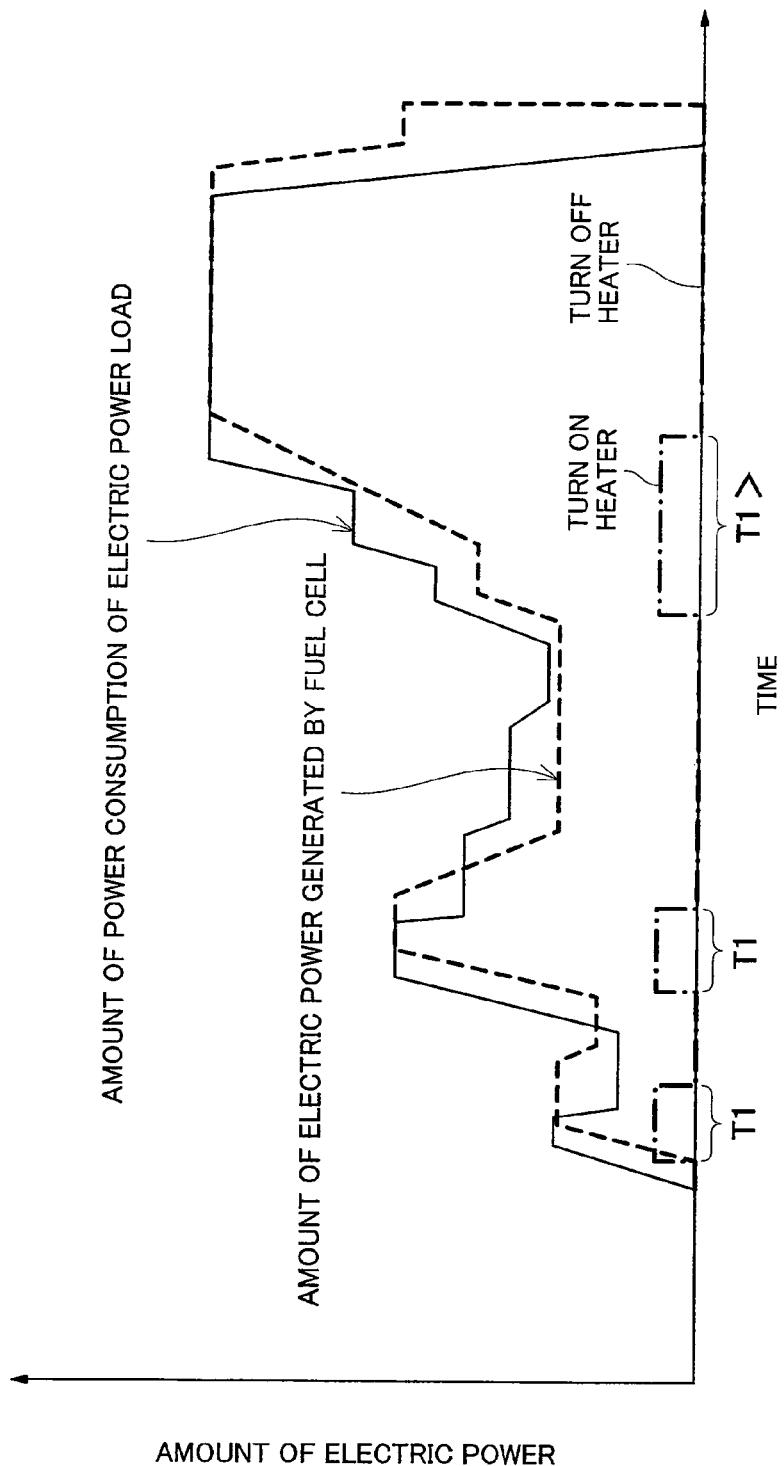
FIG. 2 is a schematic diagram showing the amount of electric power generated by the fuel cell system of Embodiment 1 of the present invention and time-lapse changes of an on operation of an electric heater.

FIG. 2 is a diagram showing time-lapse changes of the power consumption of the electric power load, time-lapse changes of the amount of electric power generated by the fuel cell 2 of the fuel cell system 100 of Embodiment 1 with respect to the above time-lapse changes of the power consumption of the electric power load, and control of on-off operations of the electric heater 8 with respect to the amount of electric power generated by the fuel cell 2.

As shown in FIG. 2, by turning on the electric heater 8 in the case of increasing the amount of electric power generated by the fuel cell 2, the fuel cell system 100 of Embodiment 1 suppresses the condensation on the CO detector 7 in a process in which a temperature of the flue gas discharged from the combustor 3 and an amount of moisture in the flue gas increase. Whether or not the amount of electric power generated by the fuel cell 2 is increased is determined based on the electric power generation amount command value output from the controller 19 to the electric power generation amount controller 15. Moreover, once the electric heater 8 is turned on, the on operation is continued for a predetermined holding time T1 or more, regardless of increase or decrease in the electric power generation amount command value of the fuel cell 2 after the electric heater 8 is turned on. Thus, frequent on-off operations of the electric heater 8 are suppressed, and this leads to suppression of deterioration of the electric heater 8.

Figure 3:
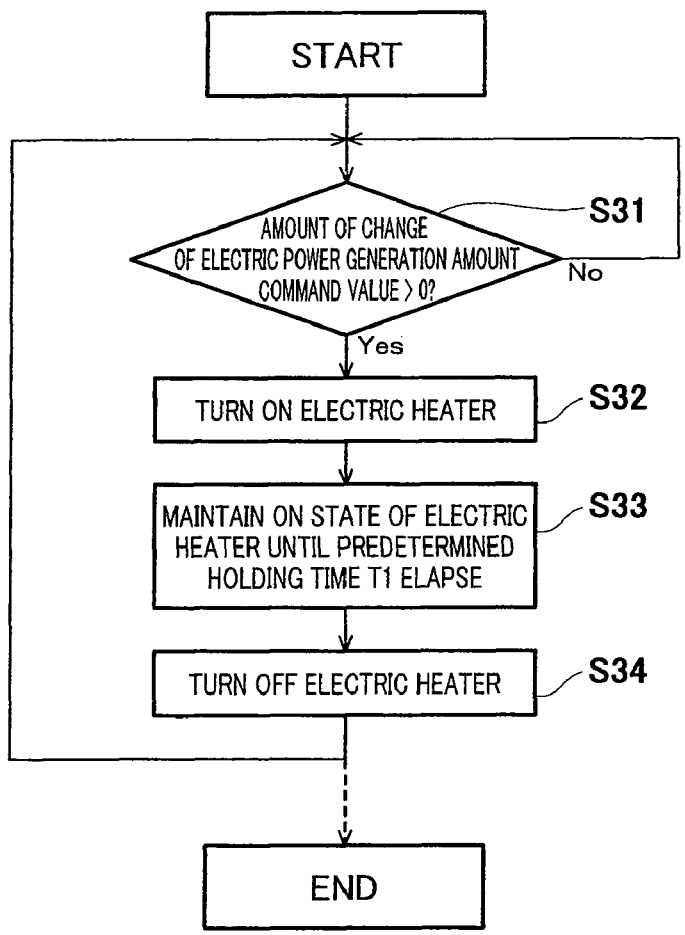
FIG. 3 is a flow chart for controlling the electric heater of the fuel cell system of Embodiment 1 of the present invention.

More specific operations of the electric heater 8 will be explained in reference to the flow chart shown in FIG. 3. First, when a start-up operation of the fuel cell system 100 is started, the controller 19 turns on the electric heater 8 to suppress the condensation on the CO detector 7. Then, when a step of increasing the temperature of the hydrogen generator 1 is completed, and the carbon monoxide in the hydrogen-containing gas generated by the hydrogen generator 1 is adequately reduced, the controller 19 switches the switching unit 18 such that the supply destination of the hydrogen-containing gas supplied from the hydrogen generator 1 is switched from a bypass passage to the fuel cell 2 side, and the start-up operation of the fuel cell system 100 is terminated. Then, an electric power generating operation of the fuel cell 2 is started.

Then, during the electric power generating operation of the fuel cell 2, the electric power generation amount command value is output from the controller 19 to the electric power generation amount controller 15 for every predetermined time. Whether or not the amount of change of the current electric power generation amount command value with respect to the previous electric power generation amount command value (output the predetermined time ago) is a positive value is determined, to be specific, whether or not the amount of electric power generated by the fuel cell 2 is increased by the controller 19 is determined (Step S31). In a case where it is determined in Step S31 that the electric power generation amount command value of the fuel cell 2 is increased, the electric heater 8 is turned on (Step S32). In a case where it is determined that the amount of electric power generated is not increased, the process returns to Step S31, and whether or not the amount of electric power generated by the fuel cell 2 is increased is determined for every predetermined time.

Next, in a case where the electric heater 8 is turned on, the electric heater 8 is maintained in an on state until the predetermined holding time T1 elapses (Step S33). After that, the electric heater 8 is turned off (Step S34). Then, in a case where the fuel cell 2 is carrying out the electric power generating operation, the process returns to Step S31, and the above operations are repeated.

The foregoing has explained that in the fuel cell system 100 of Embodiment 1, the on-off operations of the electric heater 8 are controlled based on whether or not the amount of electric power generated by the fuel cell 2 is increased. However, the fuel cell system 100 of Embodiment 1 may be configured such that during the electric power generating operation of the fuel cell system 100, the on operation of the electric heater 8 is continuously carried out, and the amount of energization to the electric heater 8 is increased or decreased in accordance with the increase or decrease in the amount of electric power generated by the fuel cell 2 (increase or decrease in the electric power generation amount command value or increase or decrease in a current value detected by the second current detector 17). To be specific, in a case where the electric power generation amount command value of the fuel cell 2 increases or in a case where the start of the increase in the amount of electric power generated by the fuel cell 2 is detected by the current value detected by the second current detector 17, it is estimated that the temperature of the flue gas passing through the CO detector 7 and the amount of moisture in the flue gas increase. Therefore, the amount of energization to the electric heater 8 is increased to increase the amount of heat generated by the electric heater 8. Moreover, in a case where the electric power generation amount command value of the fuel cell 2 decreases, it is estimated that the temperature of the flue gas passing through the CO detector 7 and the amount of moisture in the flue gas decrease. Therefore, the amount of energization to the electric heater 8 is reduced. The above phrase "amount of energization" denotes the amount of electric power supplied to the electric heater 8 per unit time. The amount of heat generated by the electric heater 8 may be increased or decreased by the increase or decrease in the amount of energization to the electric heater 8. Therefore, the fuel cell system 100 may adopt a mode in which the voltage applied to the electric heater 8 is consecutively increased or decreased. Moreover, so called "Duty control" may be carried out, i.e., a predetermined voltage pulse which is periodically turned on and off may be applied to the electric heater 8 to increase or decrease the amount of energization based on the ratio of an on time per one cycle. For example, in a case where the controller 19 applies a voltage pulse of one-second cycle to the electric heater 8 so as to turn on the electric heater 8 for 100 milliseconds and turn off for remaining 900 milliseconds, the amount of energization can be decreased by setting the on time in one-second cycle to 50 milliseconds, and the amount of energization can be increased by setting the on time in one-second cycle to 150 milliseconds.

Moreover, the controller 19 controls the electric heater 8 based on whether or not the amount of electric power generated by the fuel cell 2 is increased. However, the present embodiment is not limited to this, and the controller 19 may control the electric heater 8 based on a control value (a control value of the amount of raw material supplied to the hydrogen generator 1, a control value of the amount of water supplied to the hydrogen generator 1, a control value of the amount of air supplied to a cathode of the fuel cell 2, or the like) of a physical quantity controlled in accordance with the increase or decrease in the amount of electric power generated by the fuel cell 2 or based on a detected value of each detector (a detector configured to detect the flow rate of raw material supplied from the material supplier 12 to the hydrogen generator 1, a detector configured to detect the amount of water supplied to the hydrogen generator 1, a detector configured to detect the amount of air supplied to the cathode of the fuel cell 2, or the like), not shown, of a physical quantity controlled in accordance with the increase or decrease in the amount of electric power generated by the fuel cell 2.

Here, as described above, the fuel cell 2 generates electric power by the hydrogen-containing gas generated by the hydrogen generator 1 using the raw material supplied from the material supplier 12 and the water supplied from the water supplier 13, and the oxidizing gas (herein, air) supplied from the oxidizing gas supplier 14, and the controller 19 increases or decreases the amounts of these in accordance with the amount of electric power generated by the fuel cell 2. Therefore, instead of the amount of electric power generated by the fuel cell 2 used in Embodiment 1, the controller 19 may control the electric heater 8 based on a raw material flow rate, a water flow rate, or an air flow rate detected by each detector, or a flow rate command value to each supplier. To be specific, in a case where the raw material flow rate, the water flow rate, or the air flow rate detected by each detector, or the flow rate command value to each supplier increases, the controller 19 may adopt a mode in which the electric heater 8 is turned on or a mode in which the amount of energization to the electric heater 8 which is continuously carrying out the on operation even during the electric power generating operation is increased.

As above, the above "case where the increase in the amount of electric power generated by the fuel cell starts" defined in the present invention includes both a case where the amount of electric power generated by the fuel cell 2 is increased, i.e., a case where the increase in the control value (the electric power generation amount command value, the control value of the amount of raw material supplied, the control value of the amount of water supplied, the control value of the amount of air supplied, or the like) of the physical quantity directly or indirectly correlated to the amount of electric power generated by the fuel cell 2 starts and a case where the increase in the detected value (the detected value of the amount of current, the raw material flow rate, the water flow rate, the air flow rate, or the like) of the physical quantity directly or indirectly correlated to the amount of electric power generated by the fuel cell 2 starts.

Moreover, FIG. 2 shows that the on operation of the electric heater 8 in a certain period is longer than the predetermined holding time T1. This period is a period in which although the electric heater 8 is turned off once as above, it is determined in second or later Step S31 that the amount of change of the electric power generation amount command value of the fuel cell 2 increases, and the electric heater 8 is quickly turned on again. Therefore, the on operation of the electric heater 8 in this period becomes practically longer than the holding time T1.

In accordance with the fuel cell system 100 of Embodiment 1 explained as above, while suppressing the decrease in the energy efficiency due to the electric power consumption of the electric heater 8, the condensation of the moisture contained in the anode off gas of the fuel cell 2 with respect to the CO detector 17 can be suppressed, and the combustion stability of the combustor 3 can be more stably monitored. Moreover, once the electric heater 8 is turned on, the controller 19 causes the electric heater 8 to continue the on operation for the predetermined holding time T1, regardless of the increase or decrease of the electric power generation amount command value of the fuel cell 2 after the electric heater 8 is turned on. Thus, frequent on-off operations of the electric heater 8 are suppressed, so that the deterioration of the electric heater 8 can be suppressed.

Embodiment 2

Next, the fuel cell system of Embodiment 2 of the present invention will be explained.

The fuel cell system 100 of Embodiment 2 is the same in configuration as the fuel cell system 100 of Embodiment 1 but is different from the fuel cell system 100 of Embodiment 1 in how the controller 19 controls on and off of the electric heater 8. This difference will be explained in detail.

Figure 4:
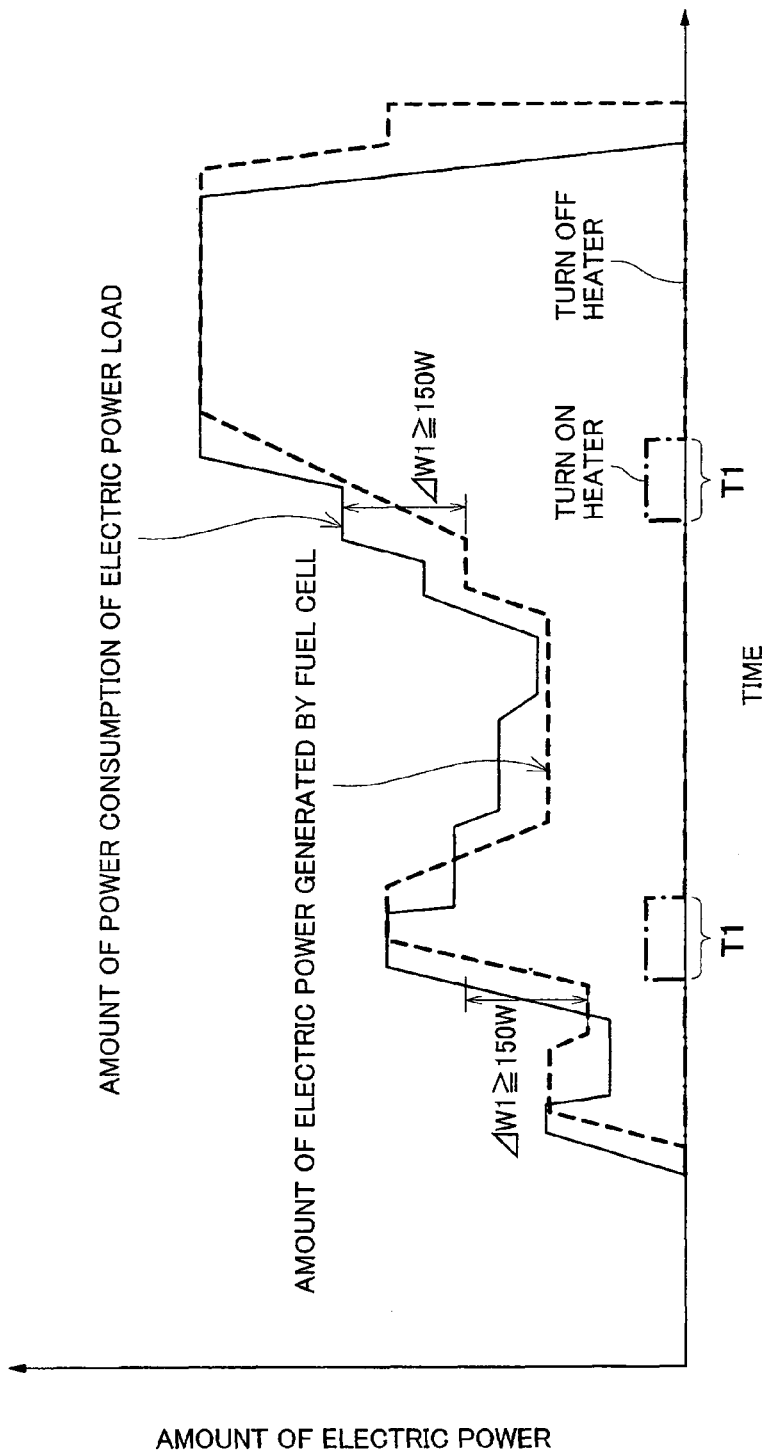
FIG. 4 is a schematic diagram showing the amount of electric power generated by the fuel cell system of Embodiment 2 of the present invention and time-lapse changes of the on operation of the electric heater.

FIG. 4 is a diagram showing time-lapse changes of the power consumption of the electric power load, time-lapse changes of the amount of electric power generated by the fuel cell 2 of the fuel cell system 100 of Embodiment 2 with respect to the above time-lapse changes of the power consumption of the electric power load, and control of the on-off operations of the electric heater 8 with respect to the amount of electric power generated by the fuel cell 2.

As shown in FIG. 4, in a case where the power consumption of the electric power load is larger than the amount of electric power generated by the fuel cell 2, the fuel cell system 100 of Embodiment 2 controls the amount of electric power generated by the fuel cell 2 such that the amount of electric power generated by the fuel cell 2 follows the power consumption of the electric load. Therefore, the electric power generation amount command value of the fuel cell 2 output from the controller 19 is likely to increase, and the electric heater 8 is turned on. To be specific, the above "case where the increase in the amount of electric power generated by the fuel cell starts" defined in the present invention includes a case where the increase in the amount of electric power generated by the fuel cell 2 is predicted. However, even in a case where the power consumption of the electric power load is larger than the amount of electric power generated by the fuel cell 2, but a difference therebetween is small, the amount of electric power generated by the fuel cell 2 is unlikely to continuously increase. Therefore, it is preferable that the fuel cell system 100 be configured such that the electric heater 8 is turned on in a case where ΔW1 that is the difference between the power consumption of the electric power load and the amount of electric power generated by the fuel cell 2 is equal to or more than a first threshold by which the amount of electric power generated by the fuel cell 2 is likely to continuously increase.

Figure 5:
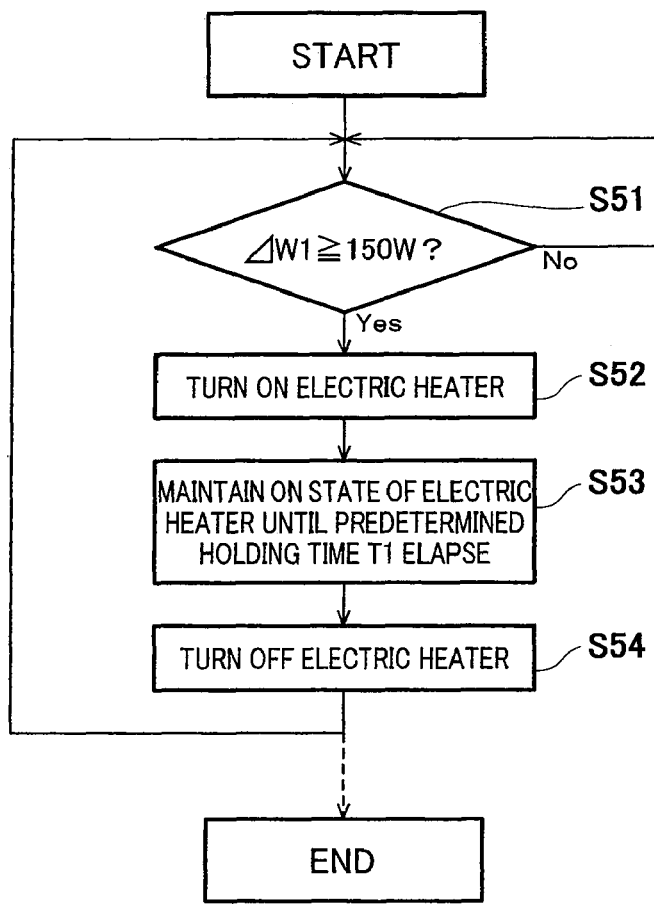
FIG. 5 is a flow chart for controlling the electric heater of the fuel cell system of Embodiment 2 of the present invention.

Hereinafter, details of the above control operation of the electric heater 8 of the fuel cell system 100 of Embodiment 2 will be explained based on the flow chart shown in FIG. 5. First, the electric power generating operation of the fuel cell 2 is started through the same start-up operation as explained in Embodiment 1, and whether or not ΔW1 that is the difference between the power consumption of the electric power load and the amount of electric power generated by the fuel cell 2 is 150 W or more is determined by the controller 19 (Step S51). Here, the power consumption of the electric power load is a sum of the electric power generation amount command value output from the controller 19 and the current value detected by the first current detector 16, and the amount of electric power generated by the fuel cell 2 is the electric power generation amount command value output from the controller 19. In this case, the controller 19 and the second current detector 17 constitute a load power detector of the present invention, and the controller 19 also functions as an electric power generation detector of the fuel cell of the present invention. Instead of the electric power generation amount command value, the current value detected by the second current detector 17 disposed on an electric wiring extending between the electric power generation amount controller 15 and the interconnection point may be used to calculate the power consumption of the electric power load, and the calculated power consumption of the electric power load may be used as the amount of electric power generated by the fuel cell 2. In this case, the first current detector 16 and the second current detector 17 constitute the load power detector of the present invention, and the second current detector 17 constitutes the electric power generation detector of the fuel cell of the present invention.

Next, in a case where it is determined in Step S51 that ΔW1 is 150 W or more, the electric heater 8 is turned on (Step S52). In a case where it is determined in Step S51 that ΔW1 is less than 150 W, the process returns to Step S51, and whether or not ΔW1 is 150 W or more is determined for every predetermined time. Next, in a case where the electric heater 8 is turned on, the electric heater 8 is maintained in an on state until the predetermined holding time T1 elapses (Step S53). After that, the electric heater 8 is turned off (Step S54). Then, in a case where the fuel cell 2 is carrying out the electric power generating operation, the process returns to Step S51, and the above operations are repeated.

The foregoing has explained that in the fuel cell system 100 of Embodiment 2, the on-off operations of the electric heater 8 are controlled based on whether or not the difference ΔW1 between the power consumption of the load power and the amount of electric power generated by the fuel cell 2 is 150 W or more. However, as with the fuel cell system 100 of Embodiment 1, the fuel cell system 100 of Embodiment 2 may be configured such that after the electric heater is once turned on, the amount of energization to the electric heater 8 may be increased or decreased in accordance with the increase or decrease in the amount of electric power generated by the fuel cell 2 (increase or decrease in the electric power generation amount command value or the detected current of the second current detector 17) after the electric heater is turned on.

In accordance with the fuel cell system 100 of Embodiment 2 explained as above, the decrease in the energy efficiency due to the electric power consumption of the electric heater 8 can be further suppressed as compared to the fuel cell system 100 of Embodiment 1. To be specific, in a case where it is assumed that the amount of electric power generated by the fuel cell 2 continuously increases and becomes a high output, the fuel cell system 100 of Embodiment 2 causes the electric heater 8 to be turned on. Therefore, after that, the on operation of the electric heater 8 is carried out only when it is required, as compared to Embodiment 1 in which the electric heater 8 is turned on in a case where the electric power generation amount command value of the fuel cell 2 increases regardless of whether or not the continuous increase in the output of the fuel cell is expected. On this account, an operating frequency of the electric heater 8 decreases, and this leads to the increase in efficiency of the fuel cell system 100 and the improvement in durability of the electric heater 8.

Embodiment 3

Next, the fuel cell system of Embodiment 3 of the present invention will be explained.

The fuel cell system 100 of Embodiment 3 is the same in configuration as the fuel cell system 100 of Embodiment 1 but is difference from the fuel cell system 100 of Embodiment 1 in how the controller 19 controls on and off of the electric heater 8. Therefore, this difference will be explained.

Figure 6:
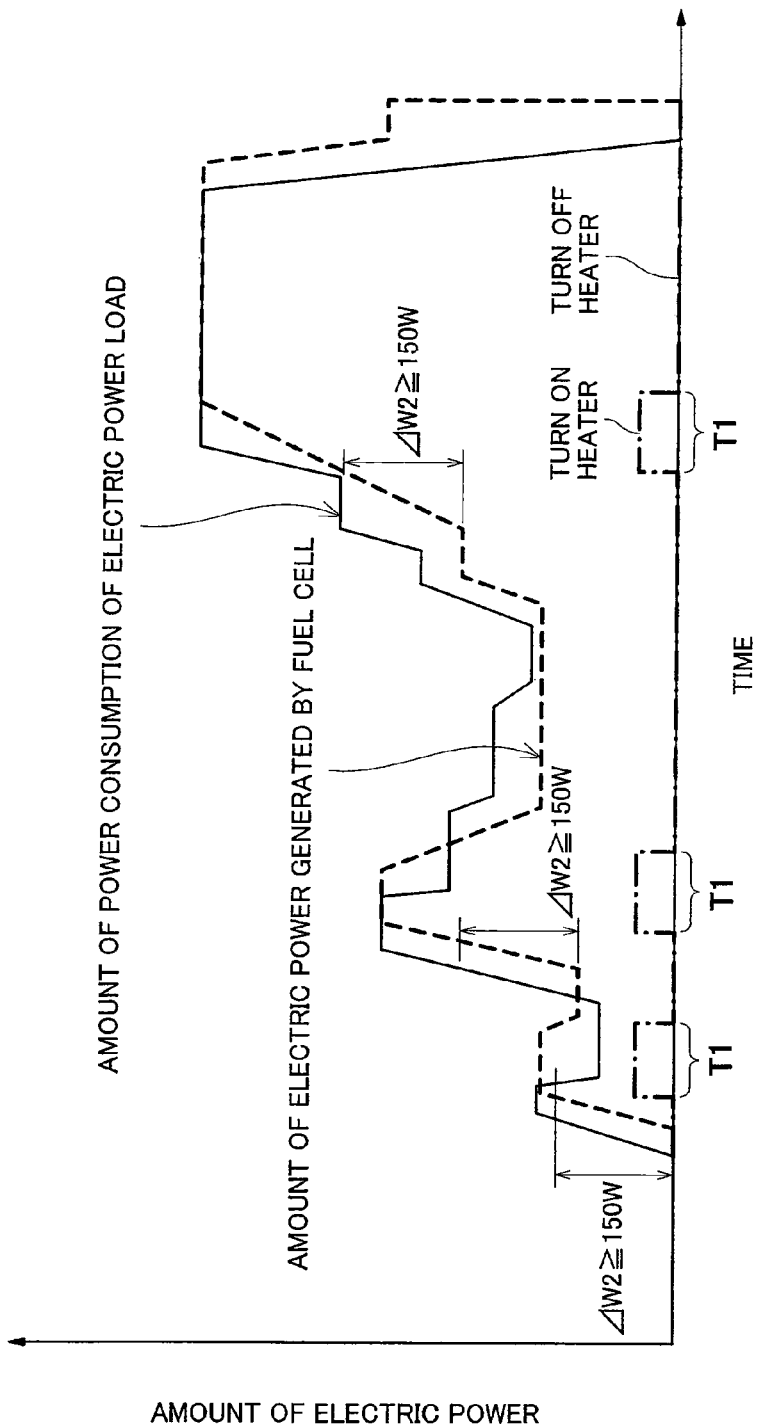
FIG. 6 is a schematic diagram showing the amount of electric power generated by the fuel cell system of Embodiment 3 of the present invention and time-lapse changes of the on operation of the electric heater.

FIG. 6 is a diagram showing time-lapse changes of the power consumption of the electric power load, time-lapse changes of the amount of electric power generated by the fuel cell 2 of the fuel cell system 100 of Embodiment 3 with respect to the above time-lapse changes of the power consumption of the electric power load, and control of the on-off operations of the electric heater 8 with respect to the amount of electric power generated by the fuel cell 2.

As shown in FIG. 6, in the fuel cell system 100 of Embodiment 3, in a case where the amount of electric power generated by the fuel cell 2 continuously increases, the amount of increase in the amount of moisture in the flue gas passing through the CO detector 7 increases, and this increases the possibility of the occurrence of the condensation on the CO detector 7. On this account, the electric heater 8 is turned on. To be specific, it is preferable that the fuel cell system 100 of Embodiment 3 be configured such that the electric heater 8 is turned on in a case where an increased amount $\Delta W2$ of the amount of electric power generated by the fuel cell 2 within a predetermined time is a second threshold or more. It is preferable that the second threshold be a predetermined value equal to or lower than an upper limit of the increased amount of the amount of electric power generated by the fuel cell 2 at which limit the condensation on the CO detector 7 does not occur. Moreover, the case where the amount of electric power generated by the fuel cell 2 continuously increases includes not only a case where the amount of electric power generated by the fuel cell 2 consecutively increases but also a case where the amount of electric power generated by the fuel cell 2 is increasing within the entire predetermined time even if it may increase or decrease to some extent within the predetermined time.

Figure 7:
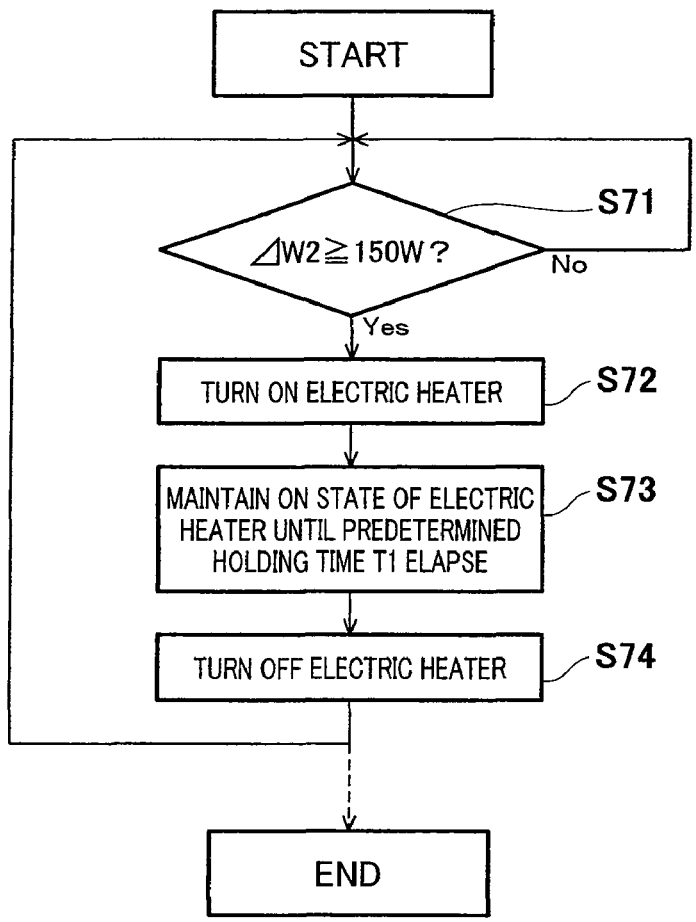
FIG. 7 is a flow chart for controlling the electric heater of the fuel cell system of Embodiment 3 of the present invention.
Figure 8:
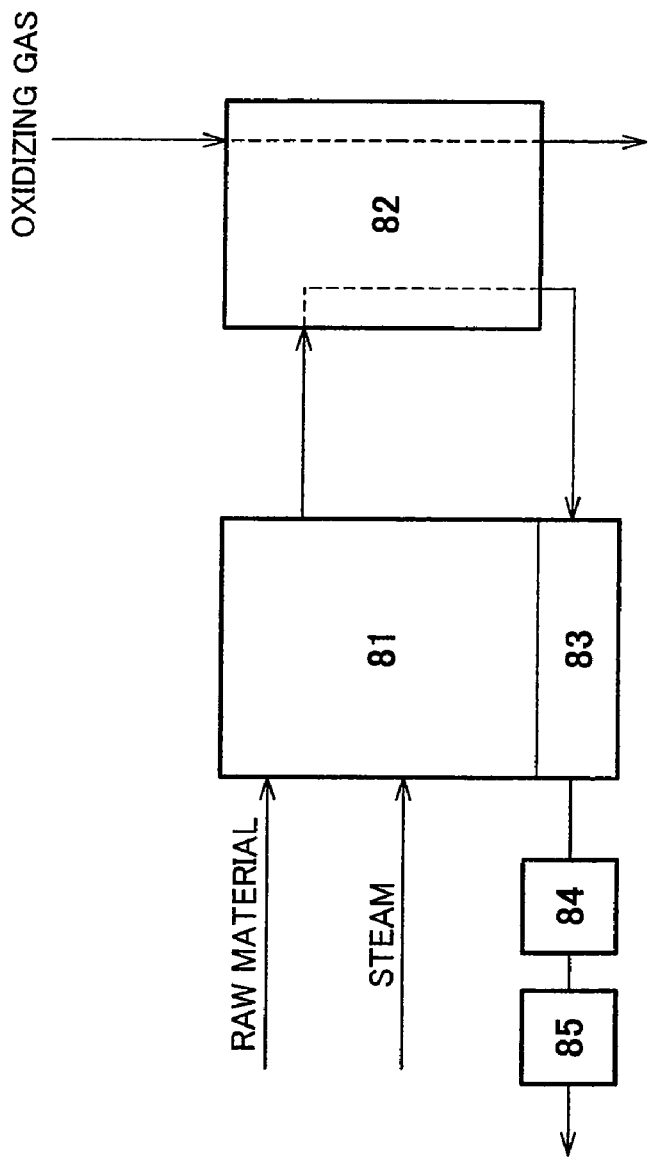
FIG. 8 is a diagram showing a configuration of a conventional fuel cell system.

Hereinafter, details of the above control operation of the electric heater 8 of the fuel cell system 100 of Embodiment 3 will be explained based on the flow chart shown in FIG. 7. First, the electric power generating operation of the fuel cell 2 is started through the same start-up operation as explained in Embodiment 1, and whether or not $\Delta W2$ that is the increased amount of the amount of electric power generated by the fuel cell 2 within the predetermined time is 150 W or more is determined by the controller 19 (Step S71). Here, used as the amount of electric power generated by the fuel cell 2 is the electric power generation amount command value output from the controller 19 or the current value detected by the second current detector 17 disposed on the electric wiring extending between the electric power generation amount controller 15 and the interconnection point. In this case, the controller 19 also functions as the electric power generation detector of the fuel cell 2 of the present invention, or the second current detector 17 constitutes the electric power generation detector of the fuel cell of the present invention.

Next, in a case where it is determined in Step S71 that $\Delta W2$ is 150 W or more, the electric heater 8 is turned on (Step S72). In a case where it is determined in Step S71 that $\Delta W2$ is less than 150 W, the process returns to Step S71, and whether or not $\Delta W2$ is 150 W or more is determined for every predetermined time. Next, in a case where the electric heater 8 is turned on, the electric heater 8 is maintained in an on state until the predetermined holding time T1 elapses (Step S73). After that, the electric heater 8 is turned off (Step S74). Then, in a case where the fuel cell 2 is carrying out the electric power generating operation, the process returns to Step S71, and the above operations are repeated.

The foregoing has explained that in the fuel cell system 100 of Embodiment 3, the on-off operations of the electric heater 8 are controlled based on whether or not the increased amount $\Delta W2$ of the amount of electric power generated by the fuel cell 2 within the predetermined time is 150 W or more. However, as with the fuel cell system 100 of Embodiment 1, the fuel cell system 100 of Embodiment 3 may be configured such that after the electric heater is once turned on, the amount of energization to the electric heater 8 may be increased or decreased in accordance with the increase or decrease in the amount of electric power generated by the fuel cell 2 (increase or decrease in the electric power generation amount command value or the detected current of the second current detector 17) after the electric heater is turned on.

In accordance with the fuel cell system 100 of Embodiment 3 explained as above, the decrease in the energy efficiency due to the electric power consumption of the electric heater 8 can be further suppressed as compared to the fuel cell system 100 of Embodiment 2. To be specific, the fuel cell system 100 of Embodiment 3 causes the electric heater 8 to be turned on after it has confirmed that the amount of electric power generated by the fuel cell 2 has been continuously increased. Therefore, the on operation of the electric heater 8 is carried out only when it is required, as compared to Embodiment 2 in which the electric heater 8 is turned on just because the output of the fuel cell 2 is likely to continuously increase. On this account, the number of unnecessary on operations of the electric heater 8 is reduced, and this lead to the increase in efficiency of the fuel cell system 100 and the improvement in durability of the electric heater 8.

Moreover, in accordance with the fuel cell system 100 of Embodiment 2, even in a case where the amount of electric power generated by the fuel cell 2 actually increases continuously, and there is a possibility that the condensation occurs on the CO detector 17, $\Delta W1$ does not become the first threshold or more, so that the electric heater 8 is not turned on, and the condensation with respect to the CO detector 17 may not be prevented. However, in accordance with the fuel cell system 100 of Embodiment 3, since the on-off operations of the electric heater 8 are controlled based on the actual amount of electric power generated by the fuel cell 2, the condensation with respect to the CO detector 17 can be more surely suppressed. The fuel cell system 100 may be configured to be able to carry out as the control of the operations of the electric heater 8 both the control of the operations of the electric heater of the fuel cell system 100 of Embodiment 2 and the control of the operations of the electric heater 8 of the fuel cell system 100 of the present embodiment.

Embodiment 4

Next, the fuel cell system of Embodiment 4 of the present invention will be explained.

The fuel cell system 100 of Embodiment 4 is the same in configuration as the fuel cell system 100 of Embodiment 1, and is characterized in that the controller 19 controls such that an average amount of energization to the electric heater 8 during the electric power generating operation of the fuel cell system 100 becomes smaller than the average amount of energization to the electric heater 8 during the start-up operation of the fuel cell system 100.

The temperatures of respective devices, such as the CO detector 7, before the start-up operation of the fuel cell system 100 are lower than those during the electric power generating operation, and they may be lowered to about an outside air temperature depending on the length of a standby time from when the operation of the fuel cell system 100 stops until when the next start-up operation of the fuel cell system 100 starts. Therefore, at the time of the start-up of the fuel cell system 100, the condensation on the CO detector 7 is likely to occur. On this account, the CO detector 7 needs to be heated by the electric heater 8. In contrast, since the temperatures of respective devices, such as the CO detector 7, are already increased in the start-up operation of the fuel cell system 100, it is unnecessary to heat the CO detector 7 during the electric power generating operation of the fuel cell system 100 by the same amount of heat as in the start-up operation of the fuel cell system 100 to suppress the condensation with respect to the CO detector 7. Therefore, to suppress the decrease in the energy efficiency due to the electric power consumption of the electric heater 8, the electric heater 8 is controlled by the controller 19 such that the average amount of energization to the electric heater 8 during the electric power generating operation of the fuel cell system 100 becomes smaller than the average amount of energization to the electric heater 8 during the start-up operation of the fuel cell system 100.

Figure 9:
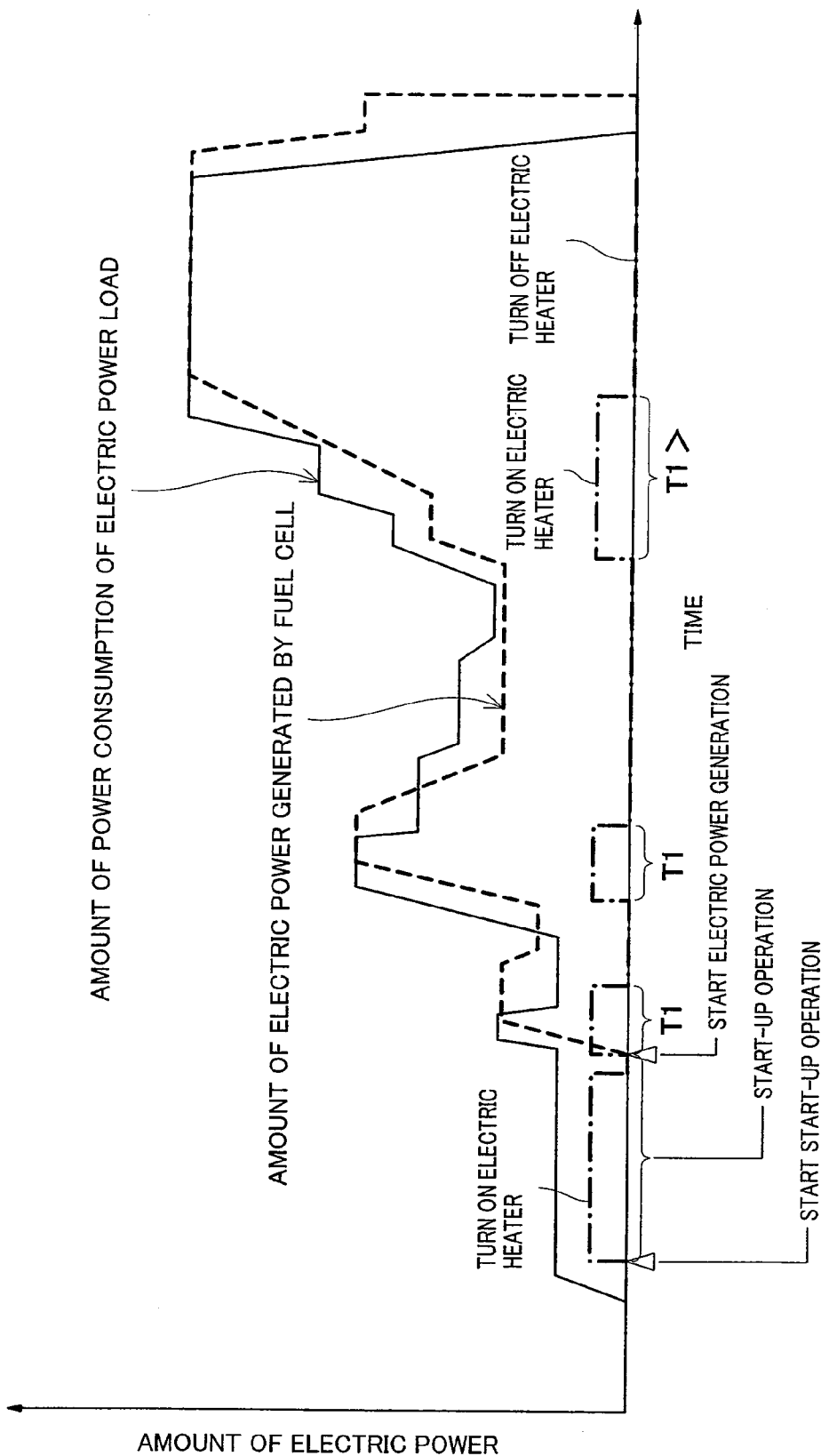
FIG. 9 is a schematic diagram showing the amount of electric power generated by the fuel cell system of Embodiment 4 of the present invention and time-lapse changes of the on operation of the electric heater.

Here, FIG. 9 is a diagram showing time-lapse changes of the power consumption of the electric power load, time-lapse changes of the amount of electric power generated by the fuel cell 2 of the fuel cell system 100 of Embodiment 4 with respect to the time-lapse changes of the power consumption of the electric power load, and control of the operations of the electric heater 8 during the start-up operation and electric power generating operation of the fuel cell system 100.

As shown in FIG. 9, the fuel cell system 100 of Embodiment 4 is configured such that only on-off control is executed as the control of the operations of the electric heater 8, and the amount of energization to the electric heater 8 is controlled depending on the length of the on time per unit time. Here, the controller 19 controls such that an average energization time (on operation time) per unit time of the electric heater 8 during the electric power generating operation of the fuel cell system 100 becomes shorter than the average energization time (on operation time) per unit time of the electric heater 8 during the start-up operation of the fuel cell system 100. With this, the controller 19 controls such that the average amount of energization to the electric heater 8 during the electric power generating operation of the fuel cell system 100 becomes smaller than the average amount of energization to the electric heater 8 during the start-up operation of the fuel cell system 100.

Specifically, in the fuel cell system 100, the on operation of the electric heater 8 is started with the start of the start-up operation of the fuel cell system 100, and the on operation of the electric heater 8 is continued until a step of increasing the temperature of the hydrogen generator 1 is completed during the start-up operation of the fuel cell system 100, and the switching unit 10 is switched to allow the hydrogen-containing gas to be supplied to the fuel cell 2. Then, as with Embodiment 1 or 2, in a case where the increase in the amount of electric power generated by the fuel cell 2 starts, the on operation of the electric heater 8 is suitably carried out for the predetermined holding time T1. Herein, the controller 19 controls such that the average amount of energization to the electric heater 8 during the electric power generating operation of the fuel cell system 100 becomes smaller than the average amount of energization to the electric heater 8 during the start-up operation of the fuel cell system 100. However, the present embodiment is not limited to this, and the controller 19 may control such that the average amount of energization to the electric heater 8 during the electric power generating operation of the fuel cell system 100 becomes smaller than a maximum amount of energization to the electric heater 8 during the start-up operation of the fuel cell system 100.

With this, in accordance with the fuel cell system 100 of Embodiment 4, while suppressing the decrease in the energy efficiency due to the electric power consumption of the electric heater 8 during the electric power generating operation, the condensation with respect to the CO detector 7 can be suppressed.

Modification Example

Figure 10:
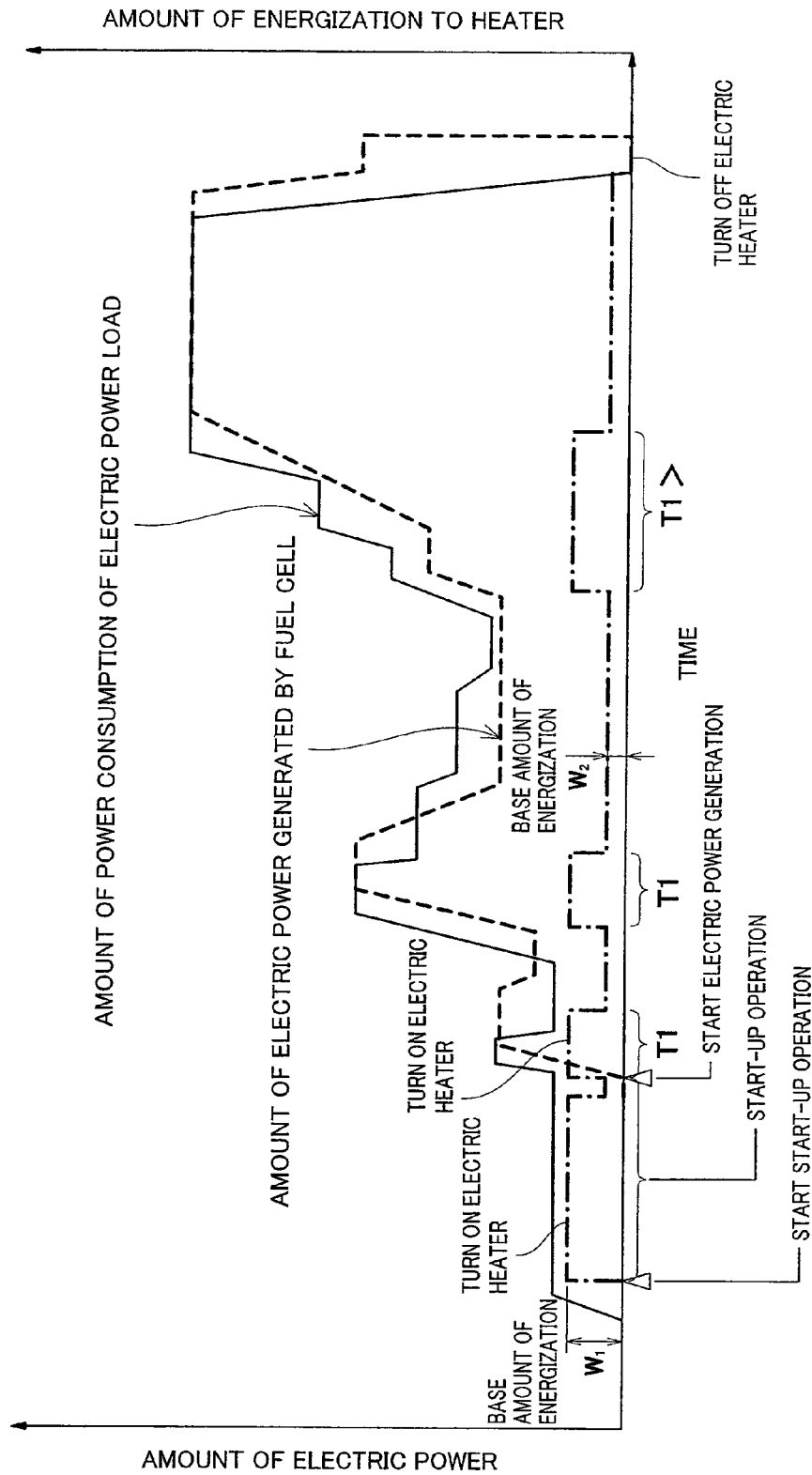
FIG. 10 is a schematic diagram showing the amount of electric power generated by the fuel cell system of Modification Example and time-lapse changes of the on operation of the electric heater.

FIG. 10 is a diagram showing time-lapse changes of the power consumption of the electric power load, time-lapse changes of the amount of electric power generated by the fuel cell 2 of the fuel cell system 100 of Modification Example with respect to the time-lapse changes of the power consumption of the electric power load, control of the operations of the electric heater 8 during the start-up operation and electric power generating operation of the fuel cell system 100, and the amount of energization to the electric heater 8.

Unlike the fuel cell system of Embodiment 4, the fuel cell system 100 of Modification Example is configured such that as the control of the operations of the electric heater 8, the controller 19 can control not only the on-off operations of the electric heater 8 but also the amount of energization to the electric heater 8 during the on operation. Then, as shown in FIG. 10, unlike Embodiment 4, the on operation of the electric heater 8 is carried out during the electric power generating operation in not only a case where the increase in the amount of electric power generated by the fuel cell 1 starts but also the other cases. Here, the amount of energization to the electric heater 8 in a case other than the case where the increase in the amount of electric power generated by the fuel cell 1 starts is controlled to be a certain amount of energization (W2) that is smaller than the amount of energization to the electric heater 8 in the case where the increase in the amount of electric power generated by the fuel cell 1 starts. The certain amount of energization in a case other than the case where the increase in the amount of electric power generated by the fuel cell 2 starts is called a first base amount of energization. Moreover, in Modification Example, the controller 10 controls the operation of the electric heater 8 such that the amount of energization to the electric heater 8 in the start-up operation of the fuel cell system 100 becomes a second base amount of energization W1 that is larger than the first base amount of energization W2. With this, as with Embodiment 4, while suppressing the decrease in the energy efficiency due to the electric power consumption of the electric heater 8 during the electric power generating operation, the condensation with respect to the CO detector 7 can be suppressed.

The fuel cell system 100 of each of Embodiment 4 and Modification Example has adopted a mode in which in a case where the increase in the amount of electric power generated by the fuel cell 2 starts, the fuel cell system 100 executes such control that the amount of energization to the electric heater 8 is increased, as with Embodiments 1 and 2. However, the fuel cell system 100 of each of Embodiment 4 and Modification Example may adopt a mode in which in a case where the amount of electric power generated by the fuel cell 2 is continuously increasing, the amount of energization to the electric heater 8 increases, as with Embodiment 3.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

In accordance with the fuel cell system of the present invention, when the amount of electric power generated by the fuel cell is increased, the condensation of moisture in the flue gas with respect to the CO detector can be suppressed, and the combustion stability of the combustor can be more stably monitored. Therefore, the fuel cell system of the present invention is useful as, for example, a domestic fuel cell system.

The invention claimed is:

1. A fuel cell system comprising:
a hydrogen generator including a reformer configured to generate a hydrogen-containing gas by a reforming reaction using a raw material;
a fuel cell configured to generate electric power using the hydrogen-containing gas supplied from the hydrogen generator;
a combustor configured to combust an anode off gas discharged from the fuel cell to heat the reformer;
a CO detector configured to detect a carbon monoxide concentration of the flue gas discharged from the combustor;
an electric heater configured to heat the CO detector; and
a controller, wherein
the controller is configured to detect a difference between an amount of power consumption of an electric power load and an amount of electric power generated by the fuel cell, and to increase an amount of energization to the electric heater during an electric power generation operation of the fuel cell system in a case where the detected difference is larger than a threshold value.

2. The fuel cell system according to claim 1, wherein the controller is configured to increase the amount of energization to the electric heater in a case where the increase in the amount of electric power generated by the fuel cell starts and an electric power generation amount command value given to the electric power generation amount controller increases.

3. The fuel cell system according to claim 2, further comprising an electric power generation amount controller configured to control an amount of electric power obtained from the fuel cell, wherein
the controller is configured to increase the amount of energization to the electric heater in a case where the electric power generation amount command value given to the electric power generation amount controller increases.

4. The fuel cell system according to claim 1, wherein the controller is configured to increase the amount of energization to the electric heater in a case where the amount of electric power generated by the fuel cell increases.

5. The fuel cell system according to claim 1, wherein increasing the amount of energization to the electric heater includes turning the electric heater from off to on.

6. The fuel cell system according to claim 5, wherein the controller controls the electric heater such that in a case where the electric heater is turned on, the electric heater is maintained in an on state for a predetermined holding time, regardless of increase or decrease in the amount of electric power generated by the fuel cell after the electric heater is turned on.

7. The fuel cell system according to claim 1, wherein an average amount of energization to the electric heater during an electric power generating operation of the fuel cell system is smaller than the average amount of energization to the electric heater during a start-up operation of the fuel cell system.

8. The fuel cell system according to claim 1, wherein an average amount of energization to the electric heater during an electric power generating operation of the fuel cell system is smaller than a maximum amount of energization to the electric heater during a start-up operation of the fuel cell system.

9. The fuel cell system according to claim 1, wherein a base amount of energization to the electric heater which is an amount before the amount of energization to the electric heater during an electric power generating operation of the fuel cell system is increased is smaller than the base amount of energization to the electric heater during a start-up operation of the fuel cell system.

10. The fuel cell system according to claim 9, wherein the base amount of energization to the electric heater which is the amount before the amount of energization to the electric heater during the electric power generating operation of the fuel cell system is zero.

11. The fuel cell system according to claim 6, wherein the controller is configured to turn off the electric heater after the on state of the electric heater is continued for the predetermined holding time.

12. The fuel cell system according to claim 1, wherein the controller is further configured to decrease, after a predetermined holding time elapses since the increasing of the amount of energization, the amount of energization.

13. The fuel cell system according to claim 1, wherein the electric heater is configured to prevent an occurrence of condensation of the CO detector.

14. A fuel cell system comprising:
a hydrogen generator including a reformer configured to generate a hydrogen-containing gas by a reforming reaction using a raw material;
a fuel cell configured to generate electric power using the hydrogen-containing gas supplied from the hydrogen generator;
a combustor configured to combust an anode off gas discharged from the fuel cell to heat the reformer;
a CO detector configured to detect a carbon monoxide concentration of the flue gas discharged from the combustor;
an electric heater configured to heat the CO detector; and
a controller, wherein
the controller is configured to detect an increase amount of electric power generated by the fuel cell during a predetermined time duration, and to increase an amount of energization to the electric heater during an electric power generation operation of the fuel cell system in a case where the detected increase amount is larger than a threshold value.

* * * * *